(No Model.)
J. P. KIRK.
PLOW.
No. 408,241. Patented Aug. 6, 1889.
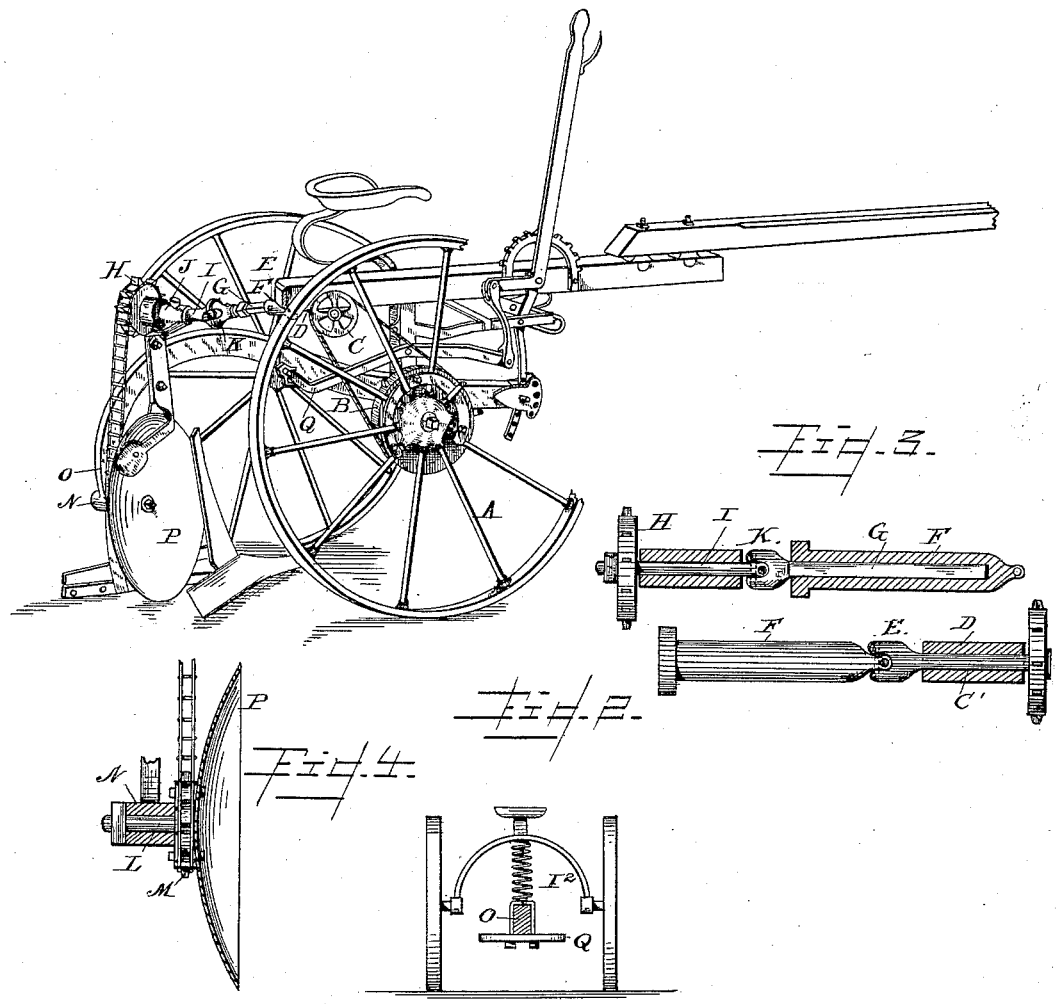
Witnesses:
Jos H Blackwood
E. Y. York
Inventor:
John P. Kirk
per A. N. Marr,
Attorney.

UNITED STATES PATENT OFFICE.

JOHN P. KIRK, OF AUSTIN, TEXAS.

PLOW.

SPECIFICATION forming part of Letters Patent No. 408,241, dated August 6, 1889.

Application filed November 10, 1888. Serial No. 290,456. (No model.)

*To all whom it may concern:*

Be it known that I, JOHN P. KIRK, a citizen of the United States, residing at Austin, in the county of Travis and State of Texas, have invented a new and useful Improvement in Plows, of which the following is a specification.

My invention relates to improvements in wheel-plows having revolving mold-boards; and the object of my improvement is to provide for a continuous motion to such moldboards. I attain this object by the mechanism illustrated in the accompanying drawings, in which—

Figure 1 shows my improvement attached to a wheel-plow in a perspective view. Fig. 2 is a rear elevation; Figs. 3 and 4, details of construction of parts.

A sprocket-wheel B is attached to the inner side of the furrow-wheel A of the plow, which by means of a link or chain belt is made to rotate a sprocket-wheel C; the shaft of which, after passing through a suitable bearing D, forms a part (knuckle) of a toggle or universal joint E. The other part (knuckle) of this toggle-joint is on the end of a square hollow shaft F. Working in this hollow shaft is a square shaft G, also provided at one end with a knuckle. A sprocket-wheel H is secured to shaft I, which, after passing through a suitable bearing at J, forms a part (knuckle) of a second toggle-joint K. A shaft L, on which is secured a sprocket-wheel M, is provided with a suitable bearing N, which is firmly secured to the beam of the plow at O. To this sprocket-wheel the disk or mold-board P is fastened and is caused to revolve by means of a link or chain belt running over the sprocket-wheel H. The toggle-joints are made complete by means of a gimbal-ring and pins or bolts. These toggle-joints and the extension-shaft allow the plow to be raised and lowered and moved to and from the land without interfering with the rotary motion of the mold-board. A suitable clutch may be provided to throw the contrivance in and out of gear; or this may be accomplished by removing the hollow square shaft.

In addition to the lever in common use to facilitate the lifting of the plow, I provide a spiral or other suitable spring $I^2$, one end of which is attached to the center of the axle immediately under the driver's seat, and the other end I fasten to the beam $o$, where it is fastened to the bail Q, connected with the said lifting-lever. (Not particularly described.) The said spring $I^2$ is to be so applied as to be at rest when the plow is raised up, and it is to be of such strength as will allow of its being extended by the weight of the plow when the same is lowered. The tendency of the spring to close or recoil has the effect to assist in raising the weight, so that but a small amount of additional force is required of the driver in lifting the plow-beam.

Having thus described my invention, what I claim as new, and desire to secure by Letters Patent, is—

1. The combination, with a plow-carriage having a sprocket-wheel attached to the driving-wheel, and a rotary mold-board provided with a sprocket-hub having bearings in the plow-beam, of a shaft journaled upon the carriage-frame and provided with toggle or universal joints, and suitable chain or belt connections for the sprocket-wheels, as and for the purpose set forth.

2. A jointed shaft journaled upon a beam of a plow-carriage, composed of parts I G F C', the said parts I and C' being provided with sprocket-wheels, the part F being in the form of a socket to receive the shaft G, and the said parts I G and F C' being connected by knuckles and pins to form universal joints, substantially as and for the purpose set forth.

JNO. P. KIRK.

Witnesses:
 DENNIS CORWIN,
 W. H. SHELLEY.